(12) United States Patent
Lin (10) Patent No.: US 7,486,331 B2
(45) Date of Patent: Feb. 3, 2009

(54) AUTO FOCUS METHODS AND AUTO FOCUS DEVICES FOR ELECTRONIC CAMERAS USING THE SAME

(75) Inventor: Yi-Hsuan Lin, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 698 days.

(21) Appl. No.: 11/098,865

(22) Filed: Apr. 5, 2005

(65) Prior Publication Data

US 2006/0061679 A1    Mar. 23, 2006

(30) Foreign Application Priority Data

Sep. 23, 2004    (TW) .............................. 93128829 A (51) Int. Cl.
*H04N 5/232*    (2006.01)
(52) U.S. Cl. .................. 348/354; 348/349; 348/240.3
(58) Field of Classification Search ................ 348/345, 348/354, 350, 349, 353, 335, 240.3
See application file for complete search history.

(56) References Cited

U.S. PATENT DOCUMENTS

| | | | |
|---|---|---|---|
| 4,903,134 A | 2/1990 | Murashima et al. | 358/227 |
| 5,235,428 A | 8/1993 | Hirota et al. | 358/227 |
| 7,092,027 B1* | 8/2006 | Mizumura | 348/345 |
| 7,262,805 B2* | 8/2007 | Yahagi et al. | 348/350 |
| 2002/0030756 A1* | 3/2002 | Inoue | 348/345 |
| 2003/0063211 A1* | 4/2003 | Watanabe et al. | 348/345 |
| 2004/0263674 A1* | 12/2004 | Koreki | 348/345 |

FOREIGN PATENT DOCUMENTS

TW    79103038    4/1979

* cited by examiner

*Primary Examiner*—Nhan T. Tran
*Assistant Examiner*—Amy Hsu
(74) *Attorney, Agent, or Firm*—Thomas, Kayden, Horstemeyer & Risley (57) ABSTRACT

Auto focus methods for electronic cameras are disclosed. The method of the present invention obtains and compares evaluation values (high frequency component (HFC)) corresponding to desired image signals from left or right locations relative to a center of a zoom lens of an electronic camera, thereby locating the maximal evaluation value. The location corresponding to the located maximal evaluation value is an optimum focus location.

18 Claims, 7 Drawing Sheets

AUTO FOCUS METHODS AND AUTO FOCUS DEVICES FOR ELECTRONIC CAMERAS USING THE SAME

BACKGROUND

The invention relates to auto focus methods, and more particularly, to methods for shortening focus time using image evaluation values.

Conventionally, auto focus methods implement processes according to generated evaluation values corresponding to desired image signals to control focus of a lens. This requires shifting a lens module repeatedly back and forth for coarse overall scanning and fine scanning, thus obtaining evaluation values corresponding to each focus locations. Next, according to focus modes, analyses and comparisons are performed to locate an optimum focus location, thereby shifting the lens module to the optimum focus location. Driving a motor, repeatedly, to carry the lens module wastes time and increase wear on the motor and transmission components thereof. If a resulting image is not the desired image, repeat focus processes waste even more time.

The described evaluation values are high frequency components (HFC), generated by images passing a band-pass filter (BPF) or high-pass filter (HPF). An evaluation curve generates a relatively maximal (or minimal) evaluation value when a zoom lens shifts, such that therefore a focus location corresponding to the evaluation value is the focal point. Due to unsatisfactory slope values of the evaluation curve, it is difficult for conventional auto focus methods to obtain the relatively maximal (or minimal) evaluation value due to the external factors, such that the optimum focus location cannot be located. In actual focus processes for a zoom lens, different zoom ratios result in discrepancies in evaluation distribution.

Figure 1A:
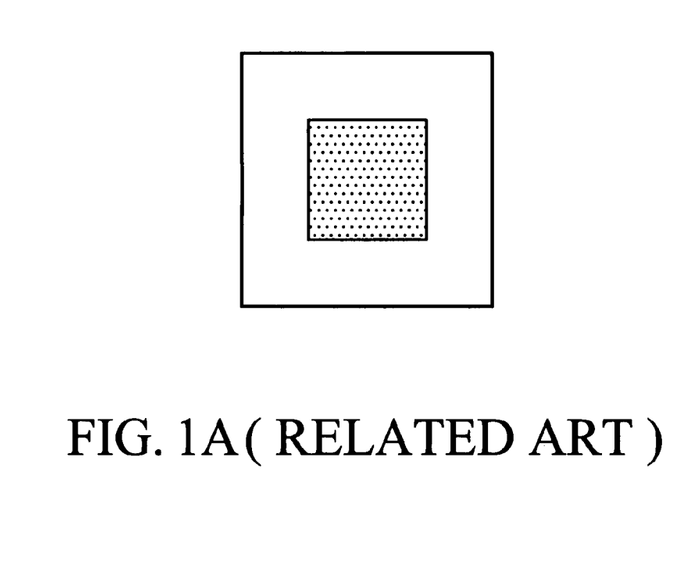
FIGS. 1A and 1B are schematic views of an evaluation curve as a zoom lens shifts to a telephotographic location.
Figure 1B:
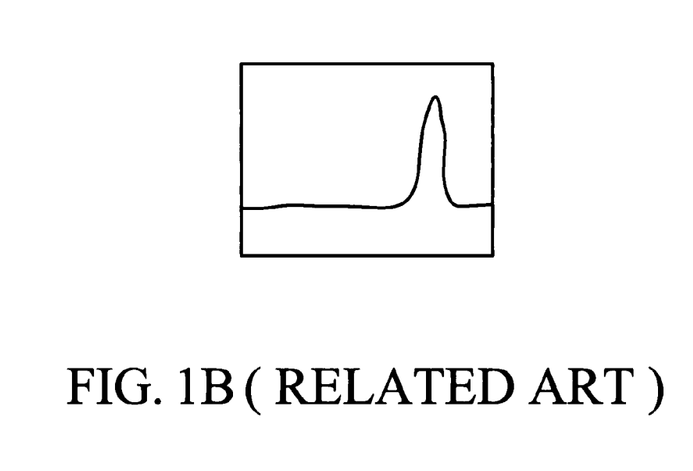
Figure 1C:
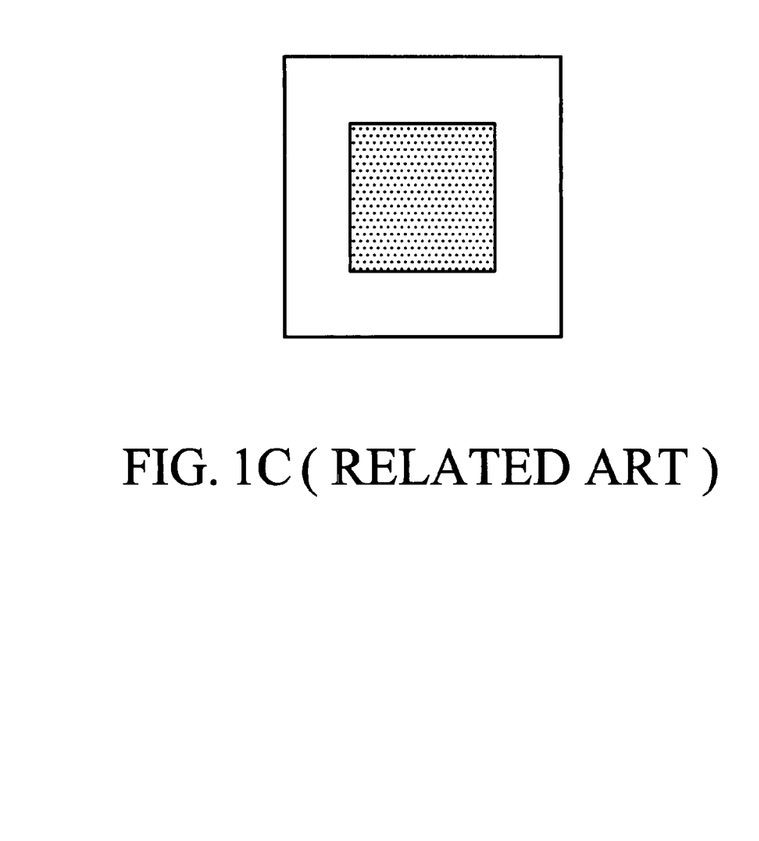
FIGS. 1C and 1D are schematic views of an evaluation curve as a zoom lens shifts to a pantoscopic location.
Figure 1D:
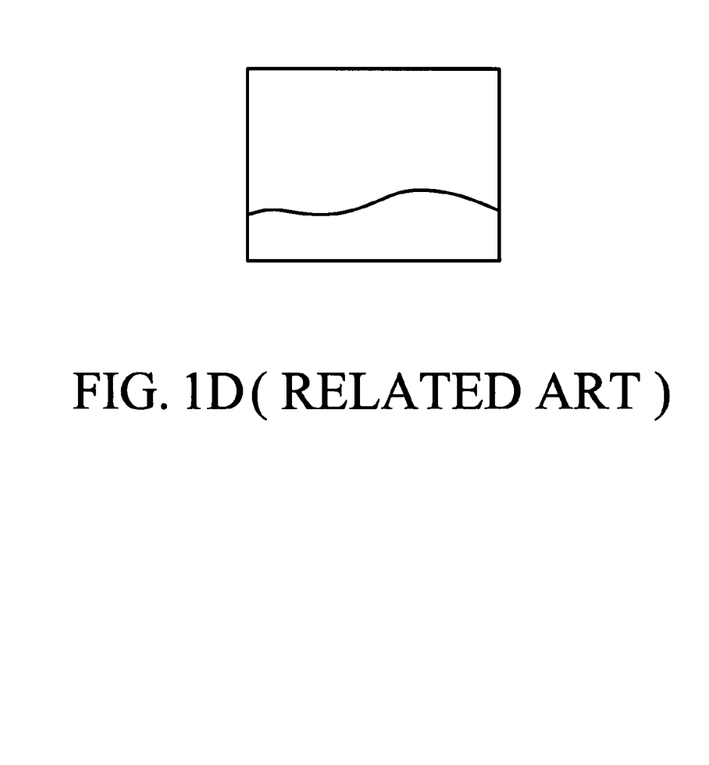

When a zoom lens shifts to a telephotographic or pantoscopic mode, problems occur if the size of a viewscreen corresponding to a focus region is fixed, such as generation of a large peak value with a steep curve when the zoom lens shifts to a telephotographic location, as shown in FIGS. 1A and 1B. Accordingly, a small peak value with a smooth curve may be generated when the zoom lens shifts to a pantoscopic location, as shown in FIGS. 1C and 1D.

One solution is design of a special filter for a specific hardware device, as disclosed in Taiwan patent No. 172155. An auto focus device of the disclosure maintains a slope value of an evaluation curve based on a fixed size of a viewscreen using high frequency components obtained through multiple high frequency filters, thus locating a focal point of the auto focus device.

Additionally, two focus control circuits can be utilized. As disclosed in U.S. Pat. No. 4,903,134, in an automatic focus circuit of a video camera, automatic focus is performed by a focus evaluation value generated in response to a video signal obtained by an image sensing circuit. A first focus motor control circuit controls the rotation of a focus motor so that a focus lens is fixed once in the position where the focus evaluation value takes the maximal value. A second focus motor control circuit changes the focus motor, by a minimum predetermined amount, to determine the slope of the focus evaluation value, which change is repeated until inversion of the slope, that is, the maximal point is detected. As a result, the position of the focus lens is corrected at the maximal point of the focus evaluation value. When the correction amount exceeds a predetermined value, first automatic focus by the first focus motor control circuit is resumed.

Further, as disclosed in U.S. Pat. No. 5,235,428, in an auto focus system, a focus detection signal is generated from a video signal produced by a video camera by deriving higher frequency components of the video signal, detecting when the higher frequency components exceed a minimal threshold, sensing when the video signal exceeds a maximal threshold, and integrating the higher frequency components which exceed the minimal threshold, except during an interval when the video signal exceeds the maximal threshold, thereby producing the focus detection signal.

Figure 2:
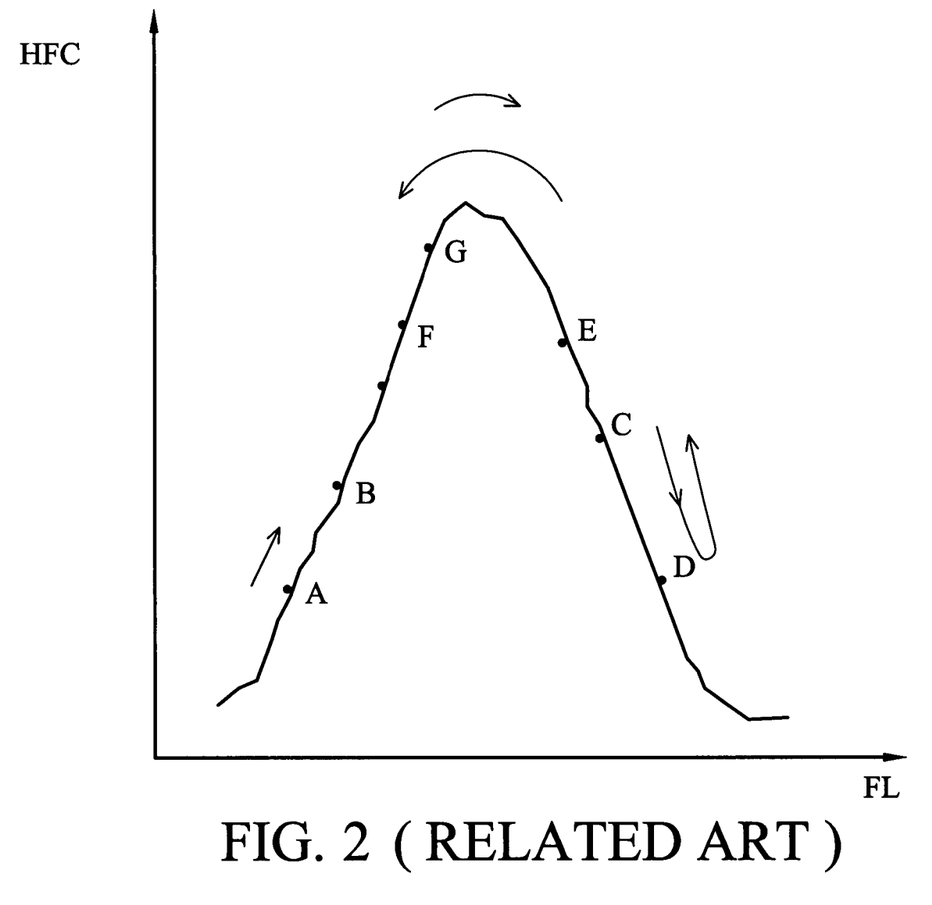
FIG. 2 is a schematic diagram of a curve generated using a mount-climbing focus method.

Additionally, FIG. 2 is a schematic diagram of a curve generated using a mount-climbing focus method. The mount-climbing focus method obtains a peak value of a curve using an asymptotic approximation method. The curve similar to the curves shown in FIGS. 1B and 1D is generated according to HFC accumulation values (i.e. evaluation values) by different focal lengths. A peak value corresponding to a maximal evaluation value on the curve corresponds to a true focal point. Defined images for a focus process depend on the highest point on the curve to be located. If the steep or smooth state described occurs, location of the peak value takes longer and even the peak value may never be ascertained.

Details of the mount-climbing focus method are further described in the following. Referring to FIG. 2, the X axis indicates focus locations (FL) and the Y axis indicates high frequency components of image signals. A start focus location is point A, and a focus motor is driven to point B (if the current direction of the motor is forward). If the high frequency component at point B exceeds the component at point A, the motor is driven to point C in the forward direction. If the high frequency component at the point C exceeds the component at point B, the motor is further driven to point D in the forward direction. As shown in FIG. 2, the high frequency component at point D is smaller than the component at point C, indicating the image captured at point C is clearer than the image captured at point D, such that the motor is reversely driven to point F. If the high frequency component at point E exceeds the component at point C, the motor is further reversely driven to point F. If the high frequency component at point F is smaller than the component at point E, the motor is further driven to point G in the forward direction. The motor is repeatedly driven back and forth to approximate the high frequency components to locate the relatively highest point on the curve, thus obtaining the maximal high frequency component. During the approximation process, if the curve shown in FIG. 2 is steep or smooth as the curve shown in FIG. 1B or 1D, and only if the motor is driven by a smaller unit distance, the maximal high frequency component is difficult to locate, thus increasing the focus time.

Additionally, another auto focus method is a seven-step method, driving a motor by seven steps as unit distances and obtaining high frequency components corresponding thereto. When all the high frequency components are obtained, a single-step method is implemented to one unit distance comprising the maximal high frequency component, thus obtaining a real maximal high frequency component. A drawback of the method is implementation of search operations to a length of a focus track only if search operations implemented to the entire focus track have been completed, using much time.

To compare the seven-step method with other auto focus methods using hardware structures, the mount-climbing focus method is simple and can rapidly locate a focal point, however, must repeatedly drive the motor back and forth to obtain the focal point, thus requiring much time. Thus, an improved auto focus method is desirable for shortened focus time.

SUMMARY

Auto focus methods applied to a zoom lens of an electronic camera are provided. The zoom lens captures image signals and is driven by a motor. In an embodiment of such a method, (a) a start location of the zoom lens is identified. (b) Relative locations of a center of a focus track and the zoom lens are determined to shift the motor in a first direction or a second direction. (c) An evaluation value corresponding to the image signals is accessed and a first evaluation value enabled to equal the evaluation value. (d) The motor is shifted by K unit distance in the first direction, where K is more than 1. (e) A subsequent evaluation value corresponding to the image signals is accessed and a second evaluation value enabled to equal the evaluation value. (f) It is determined whether the second evaluation value is smaller than the first evaluation value. (g) If the second evaluation value exceeds or equals the first evaluation value, the first evaluation value is enabled to equal the second evaluation value and step (d) is then executed. (h) If the second evaluation value is smaller than the first evaluation value, the motor is shifted by 1 unit distance in the second direction. (i) An evaluation value corresponding to the image signals is accessed and a third evaluation value is enabled to equal the evaluation value. (j) The motor is shifted by 1 unit distance in the second direction. (k) A subsequent evaluation value corresponding to the image signal is accessed and the forth evaluation value enabled to equal the evaluation value. (l) It is determined whether the forth evaluation value is smaller than the third evaluation value. (m) If the forth evaluation value exceeds or equals the third evaluation value, the third evaluation value is enabled to equal the second evaluation value and execute the step (j). (n) If the forth evaluation value is smaller than the third evaluation value, the motor is shifted by 1 unit distance in the first direction, and an accessed evaluation value corresponding to a current location of the motor is the maximal evaluation value.

Also disclosed are auto focus devices of electronic cameras. An embodiment of such a device comprises a focus module, a sensor, a signal processing unit, a data processing unit, a microcontroller, and a zoom lens sensor. The focus module further comprises a zoom lens, a motor, and a motor drive chip. The sensor obtains, from the zoom lens, and converts captured image signals to digital image data. The signal processing unit receives and processes the digital image data to generate a brightness signal. The signal processing unit calculates evaluation values corresponding to the image signals according to the brightness signal. The microcontroller determines the evaluation values and sends a control signal to the motor drive chip accordingly. The motor drive chip drives the motor, according to a control signal obtained by the microcontroller, to carry the zoom lens to a focus location. The zoom lens sensor returns a signal corresponding to a current location of the zoom lens to the microcontroller.

BRIEF DESCRIPTION OF THE DRAWINGS

The invention can be more fully understood by reading the subsequent detailed description and examples of embodiments thereof with reference made to the accompanying drawings, wherein.

DETAILED DESCRIPTION

Embodiments of the invention disclose auto focus methods and auto focus devices for electronic cameras using the same.

The method of the present invention obtains and compares evaluation values (high frequency component (HFC)) corresponding to desired image signals from left or right locations relative to a center of a zoom lens of an electronic camera, thereby locating the maximal evaluation value. The location corresponding to the located maximal evaluation value is an optimum focus location.

In an embodiment of the present invention, the number of shifting steps is determined using the following equation:

$$K = \text{Floor}[(1/FR)/SP]$$

where K represents a maximal number of shifting steps of a motor when a zoom lens accesses image signals of a video frame, Floor represents a quotient obtained by a division operation, FR (frame rate) represents resolutions of the video frame (i.e. frame number per unit time), the SP (step period) represents a marching speed of the motor (i.e. cost time per step). FR, for example, equals 33 (frame/ms), SP equals 0.01 (ms/step), so that K=Floor [(1/33)/0.01]=3, indicating motor shift of three steps to access a frame. Additionally, a value of a center of a focus track equals (Rightboundary+Leftboundary)/2, where Rightboundary represents a right boundary of the focus track and Leftboundary represents a left boundary of the focus track.

In an embodiment of the invention, the number of shifting steps for the motor is changeable and determined according to the image solution and marching speed.

Figure 3:
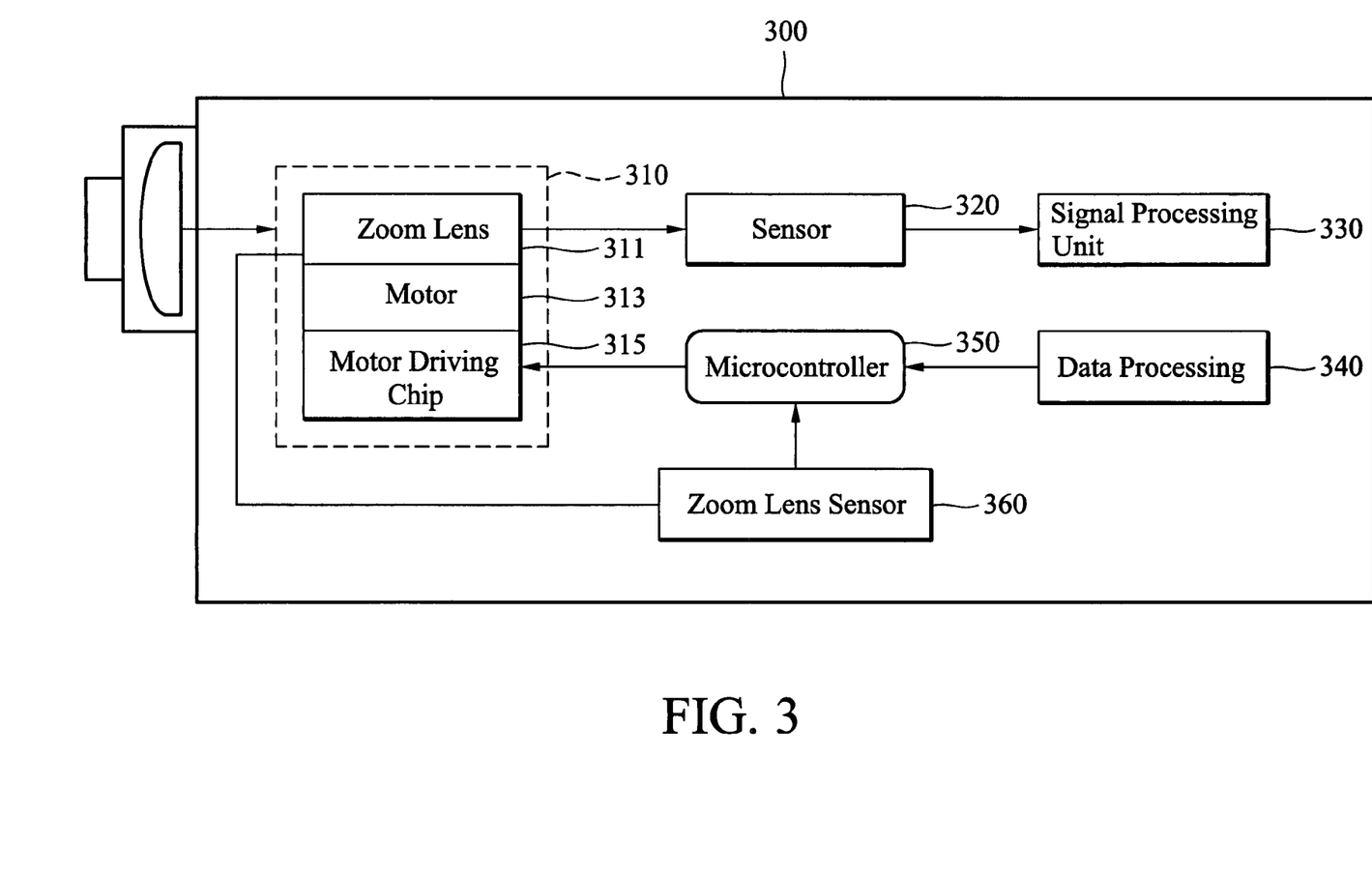
FIG. 3 is a schematic view of an embodiment of an auto focus device.

FIG. 3 is a schematic view of an embodiment of an auto focus device. Camera 300 of an embodiment of the invention comprises a focus module 310, a sensor 320, a signal processing unit 330, a data processing unit 340, a microcontroller 350, and a zoom lens sensor 360. Focus module 310 further comprises a zoom lens 311, a motor 313, and a motor drive chip 315.

Sensor 320 detects and converts image signals captured by zoom lens 311 to digital image data. Signal processing unit 330 receives and processes the digital image data to generate a brightness signal. Data processing unit 340 generates evaluation values corresponding to the image signals according to the brightness signal. Microcontroller 350 receives and determines the evaluation values, and sends a control signal to motor drive chip 315 according to determination results. Motor drive chip 315 drives motor 313 to move zoom lens 311 according to the control signal, shifting zoom lens 311 to a focus location. Zoom lens sensor 360 returns a signal corresponding to a current location of zoom lens 311 to Microcontroller 350. Additionally, a motor of an embodiment of the invention is a stepping motor. Details of the described components are further described in the following.

Referring to FIG. 3, zoom lens 311 captures image signals, sensor 320 detects and converts the image signals to digital image data, and signal processing unit 33Q receives and processes the digital image data to generate a brightness signal. Data processing unit 340 processes the brightness signal and generates evaluation values corresponding to the image signals accordingly. High frequency components (HFC) are thus obtained, determining shift directions of motor 313 and whether a focus process for zoom lens 311 is complete. Microcontroller 350 provide centralized control of camera 300, sending a control signal according to evaluations generated by data processing unit 340 and a signal (returned by zoom lens sensor 360) corresponding to a current location of zoom lens 311 to motor drive chip 315 to control drive directions and shift steps of motor 313. The drive directions and shift steps of motor 313 affect focus speed and accuracy.

As focus is initialized, microcontroller 350 accesses and assigns an evaluation value generated by data processing unit 340 as V1, and then shifts motor 313 by 3 steps (K=3 at present) in a direction (a right or left direction opposite to the center) according to the described equation and focus information. Next, two vertical synchronization signal pulses corresponding to the image signals pass and a subsequent evaluation value is accessed and assigned V2. The two vertical synchronization signal pulses are required for accurate access of V1 and V2 values. Next, microcontroller 350 determines whether V2 exceeds V1. If V2 is smaller than V1, microcontroller 350 shifts motor 313 in a reverse direction when two vertical synchronization signal pulses have passed. Microcontroller 350 resets V1 and V2 values before the shift operation is implemented, and shift motor 313 by 1 step to access an evaluation value, assigned V1. Microcontroller 350 further shifts motor 313 by 1 step in the same direction to access an evaluation value, assigned V2. Next, microcontroller 350 determines whether V2 is smaller than V1, and, if V2 exceeds or equals V1, enables V1 to equal V2 and accesses a subsequent evaluation value, when two vertical synchronization signal pulses have passed, for comparison. If V2 is smaller than V1, microcontroller 350 shifts motor 313 by 1 step in a reverse direction. Thus, a location of motor 313 is an optimum focus location.

Figure 4:
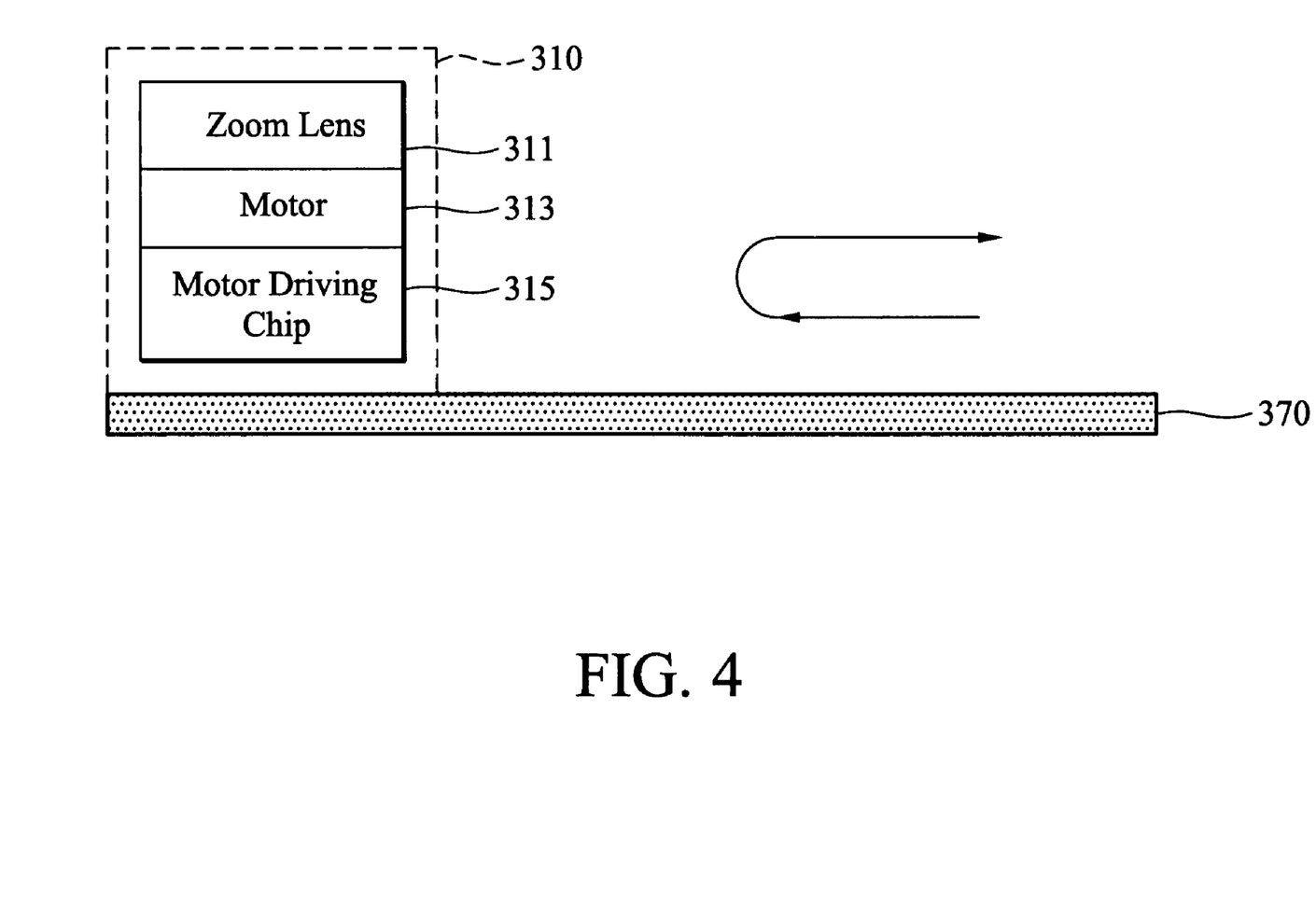
FIG. 4 is a schematic view of an embodiment of an auto focus device shifting on a focus track.

If V2 exceeds or equals V1, microcontroller 350 enables V1 to equal V2, shifts motor 313 by 3 steps in the described direction, accesses a subsequent evaluation value when two vertical synchronization signal pulses have passed, and assigns the evaluation value as V2. Next, microcontroller 350 determines whether V2 is smaller than V1 and motor 313 has reached one of both boundaries of a focus track 370 (as shown in FIG. 4). If V2 exceeds or equals V1 and motor 313 has not reached the boundary, microcontroller 350 shifts motor 313 by 3 steps in the same direction and accesses a subsequent evaluation value when two vertical synchronization signal pulses have passed. If V2 exceeds or equals V1 and motor 313 has reached the boundary, an optimum focus location is thus located, and the focus process terminates.

If V2 is smaller than V1, when two vertical synchronization signal pulses have passed, microcontroller 350 shifts motor 313 in a reverse direction irrespective of whether motor 313 has reached the boundary. Microcontroller 350 resets the V1 and V2 values before the shift operation is implemented, shifts motor 313 by 1 step, accesses an evaluation value when two vertical synchronization signal pulses have passed, and assigns the accessed evaluation value as V1. Microcontroller 350 further shifts motor 313 by 1 step in the same direction, accesses a subsequent evaluation value when two vertical synchronization signal pulses have passed, and assigns the accessed evaluation as V2. Next, microcontroller 350 determines whether V2 is smaller than V1, and, if V2 exceeds or equals V1, enables V1 to equal V2 and accesses a subsequent evaluation value, when two vertical synchronization signal pulses have passed, for comparison. If V2 exceeds V1, microcontroller 350 shifts motor 313 by 1 step in a reverse direction. Thus, a location of motor 313 is an optimum focus location.

Figure 5A:
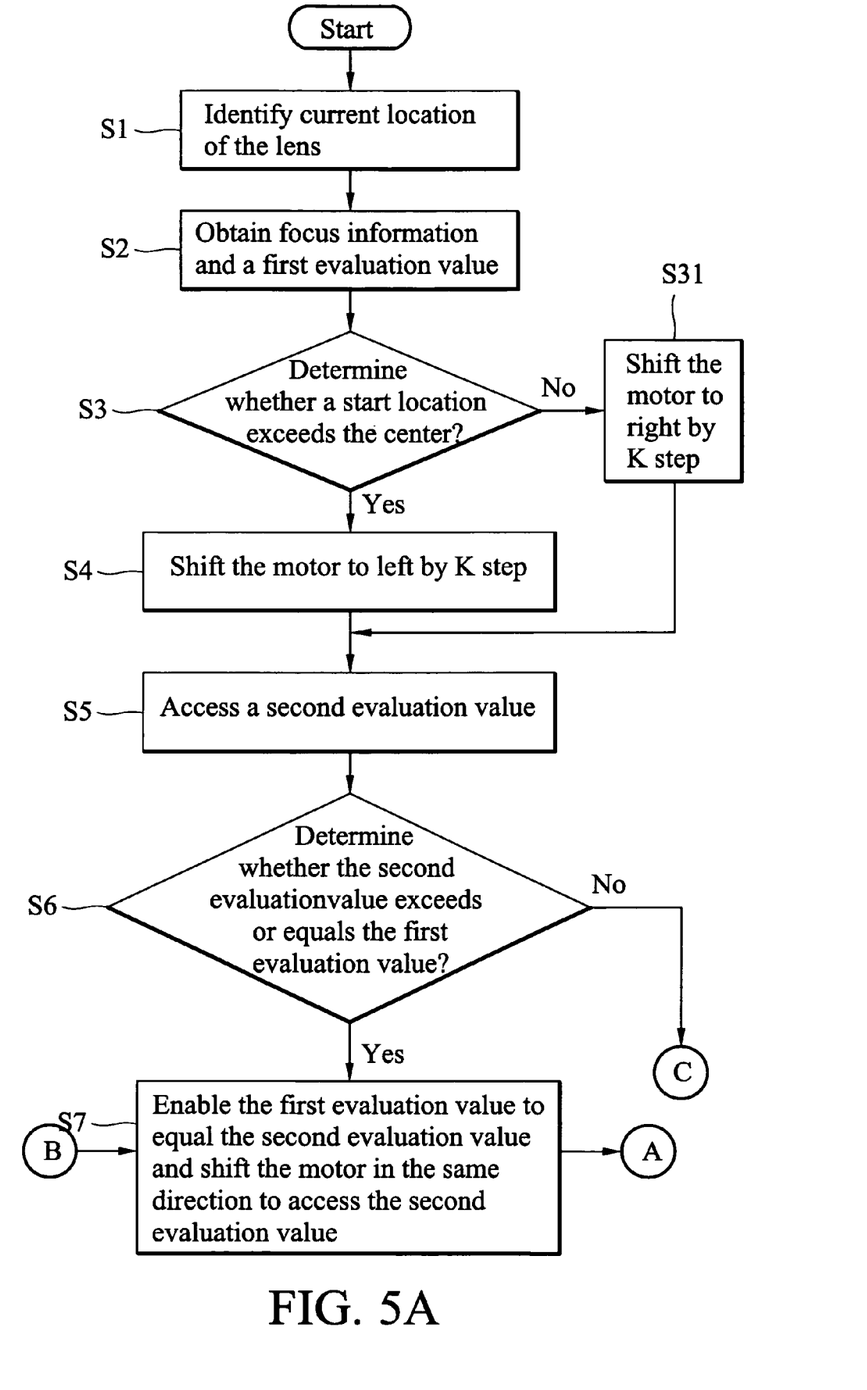
FIGS. 5A and 5B are flowcharts of an embodiment of an auto focus method.
Figure 5B:
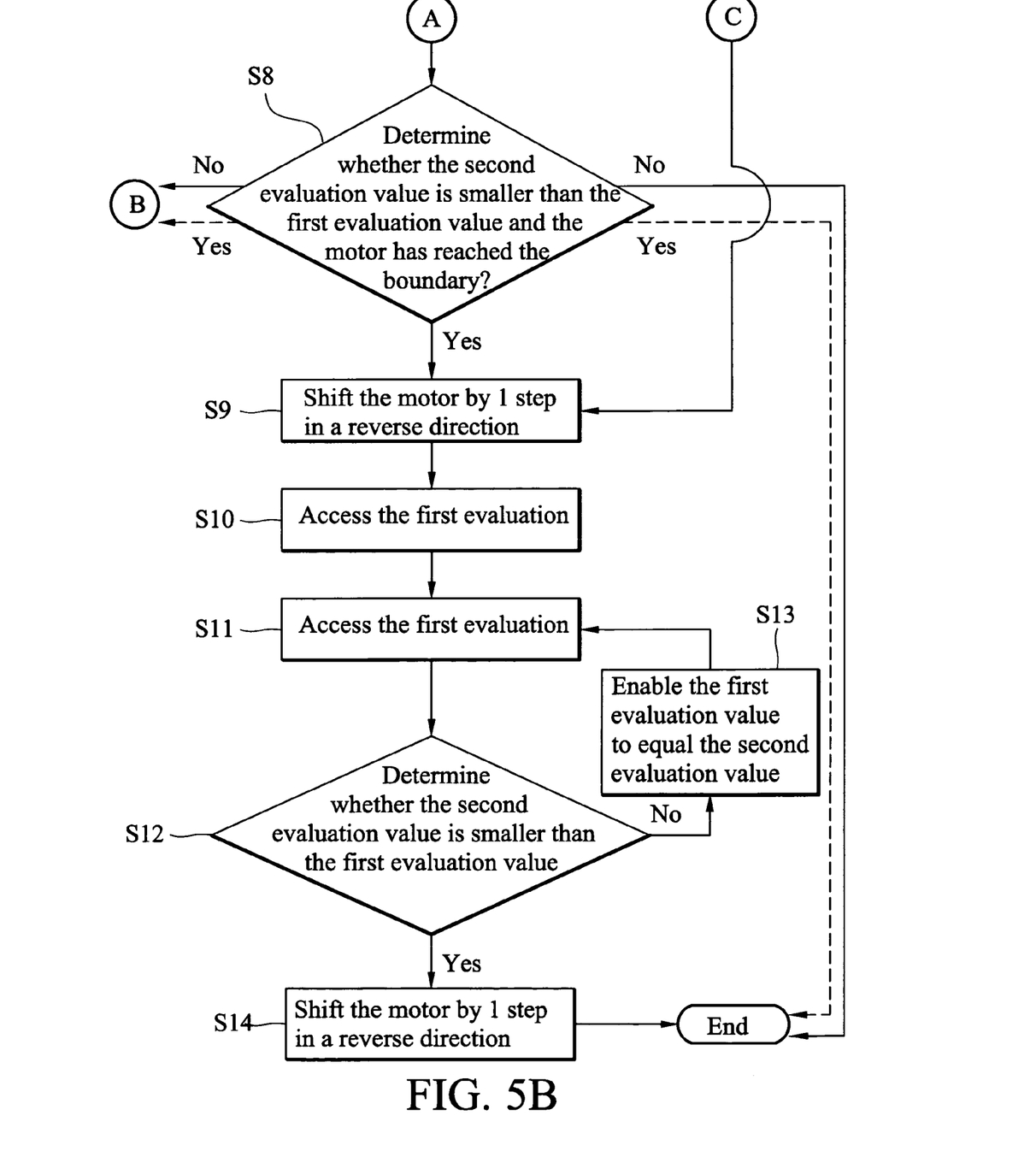

FIGS. 5A and 5B are flowchart of an embodiment of an auto focus method.

In step S1, a current location of a zoom lens is identified.

In step S2, focus information and a first evaluation value are obtained. As described, the focus information comprises the equation, image resolution, and cost time of a motor shifting 1 step. Thus, a maximal number of shifting steps of the motor can be calculated. A central location of a focus track (as shown in FIG. 4) is located and an evaluation value corresponding to a location of the motor being located is accessed and assigned V1.

In step S3, it is determined whether a start location exceeds the central location (at the right side or the central location). If so, the process goes to step S3, and, if not, to step 31. This step enables the motor to move the zoom lens to the center of the focus track for focus.

In step S31, if the motor is first at the left side of the central location, the motor is shifted by K steps in the right direction.

In step S4, if the motor is first at the right side of the central location, the motor is shifted by K steps in the left direction.

In step S5, the motor is shifted by K steps and, when two vertical synchronization signal pulses have passed, a current evaluation value is accessed and assigned V2.

In step S6, it is determined whether V2 exceeds V1 or equals V1, and, if so, the process goes to step S7, and, if not, to step S9, shifting the motor in a reverse direction. V1 and V2 are reset before the shift operation is performed.

In step S7, if V2 exceeds or equals V1, V1 is enabled to equal V2, the motor is shifted by 3 steps in the same direction, a subsequent evaluation value is accessed when two vertical synchronization signal pulses have passed, and the accessed evaluation value is assigned V2.

In step S8, it is determined whether V2 is smaller than V1 and the motor has reached one of both boundaries of a focus track (as shown in FIG. 4). If V2 exceeds or equals V1 and the motor has not reached the boundary (the solid line and the dotted line represent the boundary determination operation), the process goes to step S7, shifting the motor by 3 steps in the same direction and accessing a subsequent evaluation value when two vertical synchronization signal pulses have passed. If V2 exceeds or equals V1 and the motor has reached the boundary, an optimum focus location is thus located, and the focus process terminates. If V2 is smaller than V1, the process goes to step S9.

In step S9, if V2 is smaller than V1, when two vertical synchronization signal pulses have passed, the motor is shifted by 1 step in a reverse direction irrespective of whether the motor has reached the boundary. The V1 and V2 are reset before the shifting operation is implemented.

In step S10, a current evaluation value is accessed when two vertical synchronization signal pulses have passed, and is assigned V1.

In step S11, the motor is shifted by 1 step in the same direction and a subsequent evaluation value is accessed when two vertical synchronization signal pulses have passed. The accessed evaluation value is assigned V2.

In step S12, it is determined whether V2 is smaller than V1.

In step S13, if V2 exceeds or equals V1, V1 is enabled to equal V2, and the process goes to step S11, accessing a subsequent evaluation value, when two vertical synchronization signal pulses have passed, for comparison.

In step S14, if V2 is smaller than V1, the motor is shifted by 1 step in a reverse direction. Thus, a location of the motor is an optimum focus location.

An auto focus method of an embodiment of the invention drives a motor by an unfixed unit distance and does not require repeatedly driving the motor. An embodiment of the invention may only drive the motor back and forth two times to locate an optimum focus location. Additionally, an auto focus device of an embodiment of the invention does not implement zeroing operation before the focus process, shortening focus time.

Although the present invention has been described in terms of preferred embodiment, it is not intended to limit the invention thereto. Those skilled in the technology can still make various alterations and modifications without departing from the scope and spirit of this invention. Therefore, the scope of the present invention shall be defined and protected by the following claims and their equivalents.

What is claimed is:

1. An auto focus method, applied to a zoom lens of an electronic camera, wherein image signals are captured through the zoom lens driven by a motor, the method comprising:
   (a) identifying a start location of the zoom lens;
   (b) determining relative locations of a center of a focus track and the zoom lens to shift the motor in a first direction or a second direction;
   (c) accessing an evaluation value corresponding to the image signals and enabling a first evaluation value to equal the evaluation value;
   (d) shifting the motor by K unit distance in the first direction, where a value of K exceeds 1;
   (e) accessing a subsequent evaluation value corresponding to the image signals and enabling a second evaluation value to equal the evaluation value;
   (f) determining whether the second evaluation value is smaller than the first evaluation value;
   (g) if the second evaluation value exceeds or equals the first evaluation value, enabling the first evaluation value to equal second evaluation value and executing step (d);
   (h) if the second evaluation value is smaller than the first evaluation value, shifting the motor by 1 unit distance in the second direction;
   (i) accessing an evaluation value corresponding to the image signals and enabling a first evaluation value to equal the evaluation value;
   (j) shifting the motor by 1 unit distance in the second direction;
   (k) accessing a subsequent evaluation value corresponding to the image signals and enabling the second evaluation value to equal the evaluation value;
   (l) determining whether the second evaluation value is smaller than the first evaluation value;
   (m) if the second evaluation value exceeds or equals the first evaluation value, enabling the first evaluation value to equal the second evaluation value and executing step (j); and
   (n) if the second evaluation value is smaller than the first evaluation value, shifting the motor by 1 unit distance in the first direction;
   wherein an accessed evaluation value corresponding to a current location of the motor is the maximal evaluation value.

2. The auto focus method as claimed in claim 1, wherein step (f) further comprises:
   (f1) determining whether the second evaluation value is smaller than the first evaluation value and the motor has reached one of both boundaries of the focus track;
   (f2) if the second evaluation value exceeds or equals the first evaluation value and the motor has not reached the boundary, executing step (e);
   (f3) if the second evaluation value exceeds or equals the first evaluation value and the motor has reached the boundary, an accessed evaluation value corresponding to a current location of the motor is the maximal evaluation value; and
   (f4) if the second evaluation value is smaller than the first evaluation value, executing step (h).

3. The auto focus method as claimed in claim 1, wherein step (c) further comprises determining the K value using a mathematical equation, represented as K=Floor [(1/FR)/SP], where FR represents image resolution corresponding to the image signals and SP represents a marching speed of the motor.

4. The auto focus method as claimed in claim 1, wherein two passed vertical synchronization signal pulses corresponding to the image signals are required before evaluation value is accessed.

5. The auto focus method as claimed in claim 1, wherein step (h) further comprises clearing the first and second evaluation values before the motor is shifted in the second direction.

6. The auto focus method as claimed in claim 1, wherein step (a) is not performed during focus process.

7. An auto focus device of an electronic camera, comprising:
   a zoom lens, capturing image signals;
   a sensor, detecting and converting the captured image signals to digital image data;
   a signal processing unit, coupled to the sensor, receiving and processing the digital image data to generate a brightness signal;
   a data processing unit, coupled to the signal processing unit, successively generating a first evaluation value and a second evaluation value corresponding to the image signals according to the brightness signal;
   a motor, moving the zoom lens to a focus location; and
   a microcontroller, coupled to the data processing unit and motor, determining relative locations of a center of a focus track and the zoom lens, driving the motor to continuously move the zoom lens by K unit distance in a first direction to successively generate the first and second evaluation values, if the second evaluation value is smaller than the first evaluation value, clearing the first and second evaluation values and driving the motor to continuously carry the zoom lens by 1 unit distance in a second direction to successively generate the first and second evaluation values, and, if the second evaluation value exceeds or equals the first evaluation value, shifting the motor to continuously carry the zoom lens by 1 unit distance in the first direction to the focus location.

8. The auto focus device as claimed in claim 7, wherein when the motor shifts in the first direction and the second evaluation value exceeds or equals the first evaluation value, the microcontroller makes the first evaluation value equal the second evaluation value and shifts the motor by K unit distance in the first direction for obtaining a subsequent evaluation value.

9. The auto focus device as claimed in claim 8, wherein when the motor shifts in the second direction and the second evaluation value exceeds or equals the first evaluation value, the microcontroller makes the first evaluation value equal the second evaluation value and shifts the motor by 1 unit distance in the second direction for obtaining a subsequent evaluation value.

10. The auto focus device as claimed in claim 7, wherein the microcontroller further determines whether the second evaluation value is smaller than the first evaluation value and the motor has reached one of both boundaries of the focus track, and, if the second evaluation value exceeds or equals the first evaluation value and the motor has not reached the boundary, makes the first evaluation value equal the second evaluation value and shifts the motor by K unit distance in the first direction for obtaining a subsequent evaluation value.

11. The auto focus device as claimed in claim 10, wherein if the second evaluation value exceeds or equals the first evaluation value and the motor has reached the boundary, an accessed evaluation value corresponding to a current location of the motor is the maximal evaluation value.

12. The auto focus device as claimed in claim 11, wherein if the second evaluation value is smaller than the first evaluation value, the microcontroller clears the first and second evaluation values and shifts the motor in the second direction.

13. The auto focus device as claimed in claim 7, wherein the microcontroller identifies a start location of the zoom lens before focus process is performed.

14. The auto focus device as claimed in claim 7, wherein the microcontroller determines the K value using a mathematical equation, represented as K=Floor [(1/FR) /SP], where FR represents image resolution corresponding to the image signals and SP represents a marching speed of the motor.

15. The auto focus device as claimed in claim 7, wherein two passed vertical synchronization signal pulses corresponding to the image signals are required before the evaluation value is accessed.

16. The auto focus device as claimed in claim 7, further comprising a motor drive chip, driving the motor, according to a control signal obtained by the microcontroller, to carry the zoom lens to the focus location.

17. The auto focus device as claimed in claim 7, further comprising a zoom lens sensor, returning a signal corresponding to a current location of the zoom lens to the microcontroller.

18. The auto focus device as claimed in claim 7, wherein a value of the K exceeds 1.

* * * * *